(12) United States Patent
Wang

(10) Patent No.: US 12,739,413 B2
(45) Date of Patent: Sep. 15, 2026

(54) MEMORY MANAGEMENT METHOD AND VIDEO PLAYER SYSTEM FOR PLAYING MULTICHANNEL VIDEO

(71) Applicant: REALTEK SEMICONDUCTOR CORPORATION, Hsinchu (TW)

(72) Inventor: Jie Wang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 481 days.

(21) Appl. No.: 18/232,845

(22) Filed: Aug. 11, 2023

(65) Prior Publication Data

US 2024/0129501 A1 Apr. 18, 2024

(30) Foreign Application Priority Data

Oct. 12, 2022 (CN) ......................... 202211247923.8

(51) Int. Cl.
*H04N 19/172* (2014.01)
*H04N 19/423* (2014.01)

(52) U.S. Cl.
CPC ......... *H04N 19/423* (2014.11); *H04N 19/172* (2014.11)

(58) Field of Classification Search
CPC ........................... H04N 19/172; H04N 19/423
(Continued)

(56) References Cited

U.S. PATENT DOCUMENTS 8,032,719 B2 * 10/2011 Bowers ................ H04N 19/172 711/154
2005/0180643 A1 * 8/2005 Okada .................. H04N 19/423 375/E7.161

(Continued)

FOREIGN PATENT DOCUMENTS

CN 106921862 A * 7/2017 ........... H04N 19/436
CN 109271327 A * 1/2019 ......... G06F 12/0223

(Continued)

OTHER PUBLICATIONS

OA letter of a counterpart TW application (appl. no. 111140523) mailed on Oct. 5, 2023. Summary of the TW OA letter: 1. Claims 1-10 are rejected as allegedly being unpantentable over cited reference 1 (CN 110659225 A) in view of cited reference 2 (CN 109271327 A, also published as US20200210329A1). Correspondence between claims of TW counterpart application and claims of US application: 1. Claims 1-3, 4, and 5-10 in TW counterpart application correspond to claims 1-3, 5, and 7-12 in US application, respectively.

*Primary Examiner* — Kathleen M Walsh
(74) *Attorney, Agent, or Firm* — WPAT, PC

(57) ABSTRACT

A memory management method includes the following operations: setting a first data value of first frame data to a first value to assign a first decoder in a plurality of decoders that corresponds to the first value to decode the first frame data, setting a second data value of the first frame data to a second value, and outputting the first frame data to an application layer; based on a control of the application layer, setting a third data value of the first frame data to a third value, in order to assign a first video output transmitter in a plurality of video output transmitters to output the first frame data; and determining whether to clear a storage space in a memory that stores the first frame data according to the first data value, the second data value, and the third data value.

20 Claims, 9 Drawing Sheets

(58) Field of Classification Search
USPC .................................................... 375/240.25
See application file for complete search history.

(56) References Cited

U.S. PATENT DOCUMENTS

| | | | | |
|---|---|---|---|---|
| 2015/0201205 | A1* | 7/2015 | Lee | H04N 19/423<br>711/125 |
| 2018/0227626 | A1* | 8/2018 | Nakazawa | H04N 21/4343 |
| 2020/0210329 | A1* | 7/2020 | Xu | G06F 12/0207 |

FOREIGN PATENT DOCUMENTS

| | | | | | |
|---|---|---|---|---|---|
| CN | 110659225 | A | * | 1/2020 | G06F 9/5016 |
| CN | 114584786 | A | * | 6/2022 | G06F 9/5016 |
| CN | 114710702 | A | * | 7/2022 | H04N 21/431 |

* cited by examiner

Figure 4:
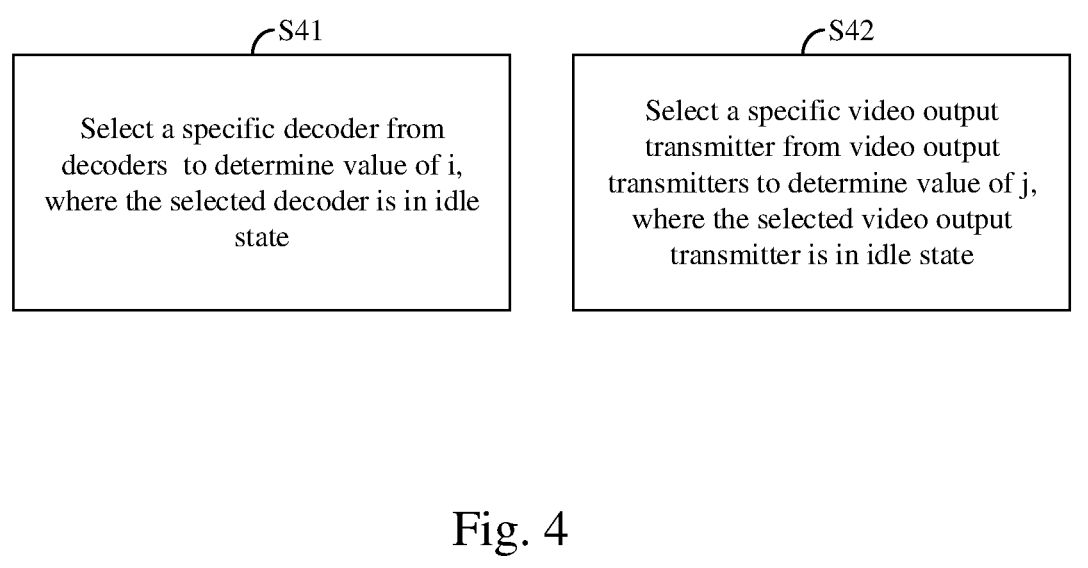

S41

Select a specific decoder from decoders to determine value of i, where the selected decoder is in idle state

S42

Select a specific video output transmitter from video output transmitters to determine value of j, where the selected video output transmitter is in idle state

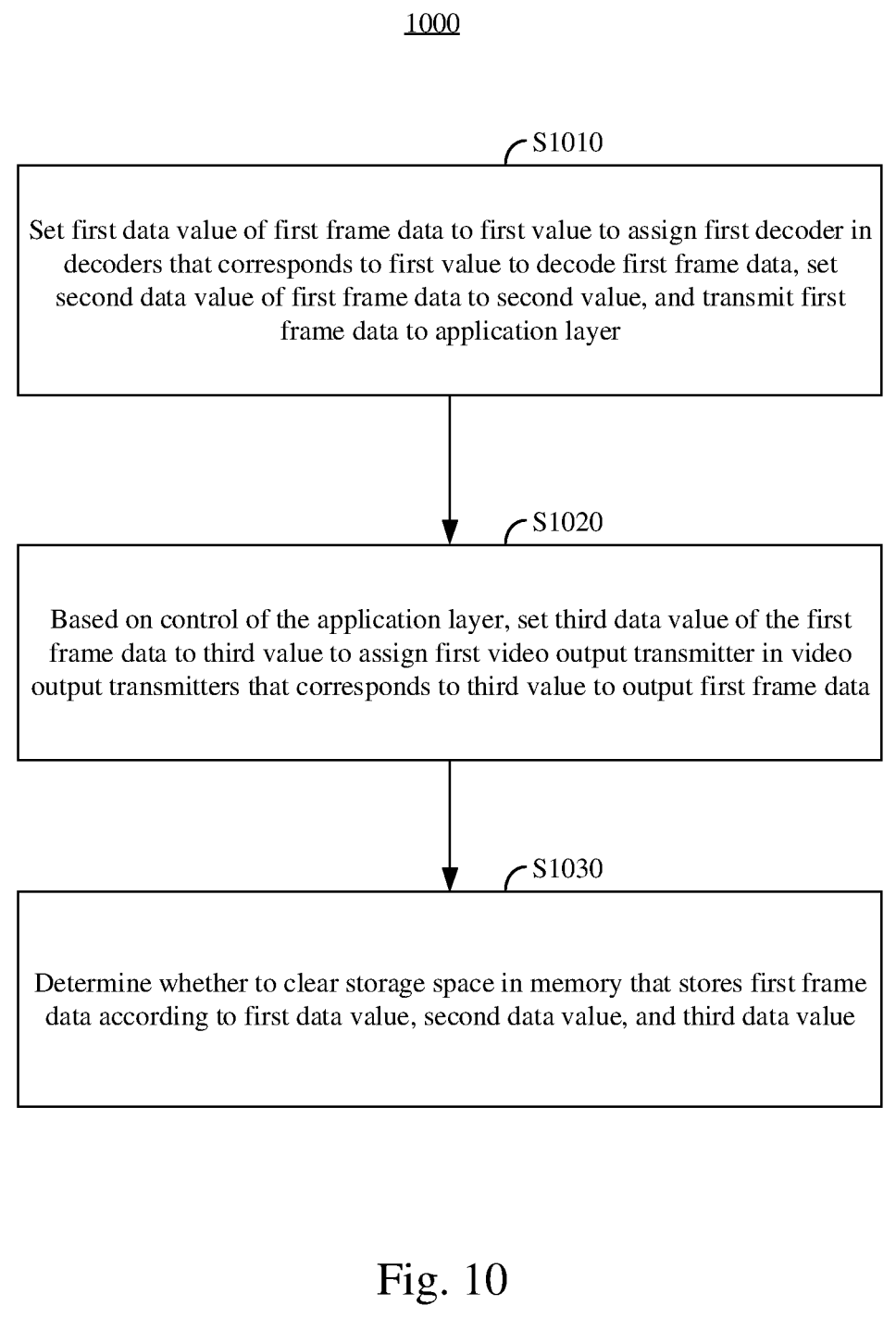

Set first data value of first frame data to first value to assign first decoder in decoders that corresponds to first value to decode first frame data, set second data value of first frame data to second value, and transmit first frame data to application layer

S1020

Based on control of the application layer, set third data value of the first frame data to third value to assign first video output transmitter in video output transmitters that corresponds to third value to output first frame data

S1030

Determine whether to clear storage space in memory that stores first frame data according to first data value, second data value, and third data value

Fig. 10

MEMORY MANAGEMENT METHOD AND VIDEO PLAYER SYSTEM FOR PLAYING MULTICHANNEL VIDEO

BACKGROUND OF THE INVENTION

1. Field of the Invention

The present disclosure relates to a memory management method, especially to a memory management method and a video player system for playing multichannel video.

2. Description of Related Art

Currently, in existing technology, video player systems replicate image data and transfer them between modules or circuits within the system to achieve multi-channel video player. However, the replication of a large amount of image data significantly impacts the efficiency of the video player system. Providing hardware performance directly or increasing memory capacity will result in excessively high costs for the video player system. Therefore, multi-channel video player systems are currently limited by the cost and efficiency of the system.

SUMMARY OF THE INVENTION

In some aspects of the present disclosure, an object of the present disclosure is, but not limited to, provide a memory management method and a video player system that may improve usage efficiency of the memory with reference information of frame data, so as to make an improvement to the prior art.

In some aspects of the present disclosure, a memory management method includes the following operations: setting a first data value of first frame data to a first value to assign a first decoder in a plurality of decoders that corresponds to the first value to decode the first frame data, setting a second data value of the first frame data to a second value, and outputting the first frame data to an application layer; based on a control of the application layer, setting a third data value of the first frame data to a third value, in order to assign a first video output transmitter in a plurality of video output transmitters to output the first frame data; and determining whether to clear a storage space in a memory that stores the first frame data according to the first data value, the second data value, and the third data value.

In some aspects of the present disclosure, a video player system includes a decoder circuit and a video output circuit. The decoder circuit includes a plurality of decoders and is configured to set a first data value of first frame data to a first value to assign a first decoder in the plurality of decoders that corresponds to the first value to decode the first frame data, set a second data value of the first frame data to a second value, and transmit the first frame data to an application layer. The video output circuit includes a plurality of video output transmitters and is configured to, based on a control of the application layer, set a third data value of the first frame data to a third value to assign a first video output transmitter in the plurality of video output transmitters that corresponds to the third value to output the first frame data. The decoder circuit or the video output circuit is further configured to determine whether to clear a storage space in a memory that stores the first frame data according to the first data value, the second data value, and the third data value.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 4 illustrates a flowchart of the decoder circuit and the video output circuit in FIG. 1 selecting a specific decoder and a specific video output transmitter according to some embodiments of the present disclosure.

FIG. 10 illustrates a flowchart of a memory management method according to some embodiments of the present disclosure.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may be a single system formed with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
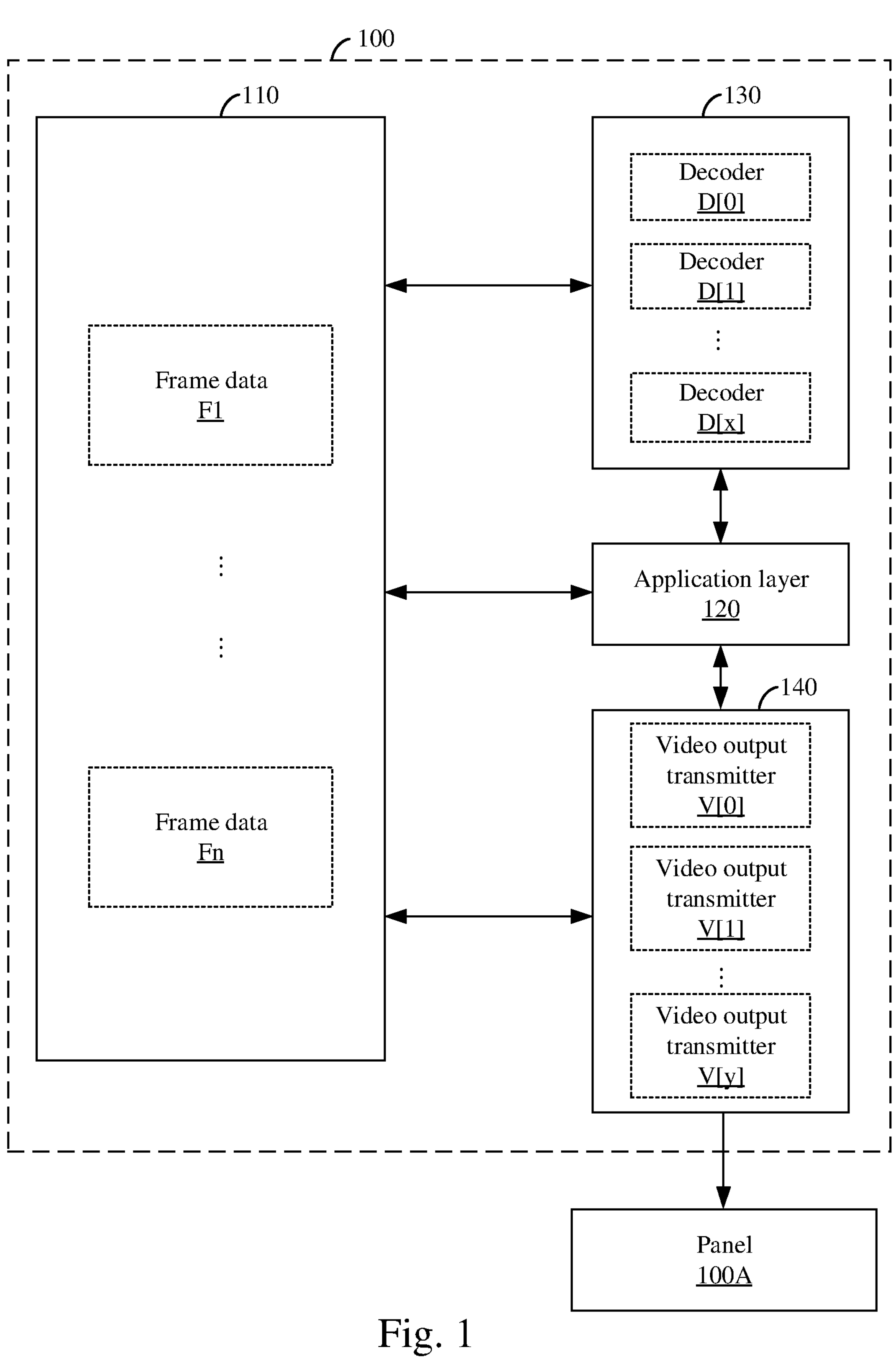
FIG. 1 illustrates a schematic diagram of a video player system according to some embodiments of the present disclosure.

FIG. 1 illustrates a schematic diagram of a video player system 100 according to some embodiments of the present disclosure. In some embodiments, the video player system 100 may manage multiple storage spaces in a memory 110 by performing a memory management method 1000 in FIG. 10, in order to play multi-channel video.

The video player system 100 includes a memory 110, an application layer 120, a decoder circuit 130, and a video output circuit 140. The memory 110 may receive one or more videos from multiple signal sources through a receiver circuit (not shown) and store frame data F1-Fn of each of the one or more videos, where n is a positive integer greater than or equal to 1. In some embodiments, the memory 110 may be divided into multiple storage spaces, which operate as multiple video buffers to sequentially store the frame data F1-Fn.

In some embodiments, the application layer 120 includes software that runs on at least one processor circuit (not shown). For example, the video player system 100 is built on an Android system, and the application layer 120 includes an Android application package (APK), multimedia codec (MediaCodec), surface preview (Surface View), and/or system kernel. In some embodiments, the application layer 120 includes at least one application software for playing video, and the decoder circuit 130 and the video output circuit 140 can be controlled by requests and/or instructions issued by the at least one application software to process the frame data F1-Fn in the memory 110.

The decoder circuit 130 may decode the frame data F1-Fn and transmit the decoded frame data F1-Fn to the application layer 120. The application layer 120 may determine, based on user control, whether to output the frame data F1 to Fn via the video output circuit 140 or discard the frame data F1-Fn. In some embodiments, the decoder circuit 130 includes decoders D[0]-D[x], each corresponding to a different channel, where x is a positive integer greater than 0.

The video output circuit 140 may output the frame data F1-Fn to a panel 100A based on the control of the application layer 120, to drive the panel 100A to display the image content of the frame data F1-Fn. In some embodiments, the video output circuit 140 may include, but not limited to, a frame rate convertor circuit, a scaler circuit, an image renderer circuit, and so on, to read the decoded frame data F1-Fn from storage spaces in the memory 110 for subsequent processing. In some embodiments, the video output circuit 140 includes video output transmitters V[0]-V[y], each corresponding to a different channel, where y is a positive integer greater than 0.

In some embodiments, the application layer 120, the decoder circuit 130, and the video output circuit 140 may share some hardware through software and/or firmware control. For example, the functions of the decoders D[0]-D[x] and/or the video output transmitters V[0]-V[y] may be performed by the processor circuit running the application layer 120, to implement video decoding and/or video output operations.

In some embodiments, a decoder in the decoder circuit 130 may use a specific storage space in the memory 110 to access and decode a specific frame data. Similarly, a video output transmitter in the video output circuit 140 may use a specific storage space in the memory 110 to access and output the specific frame data. When the access to the specific storage space is stopped, the decoder or the video output transmitter may immediately clear and release the specific storage space without affecting the operation of other channels.

In some embodiments, through additional definitions, each of the frame data F1-Fn may include multiple data values, and the decoder circuit 130 and/or the video output circuit 140 may confirm whether to clear and release a storage space in the memory 110 that stores the specific frame data based on these data values. Further explanations regarding herein will be described with reference to FIGS. 2 to 9.

Figure 2:
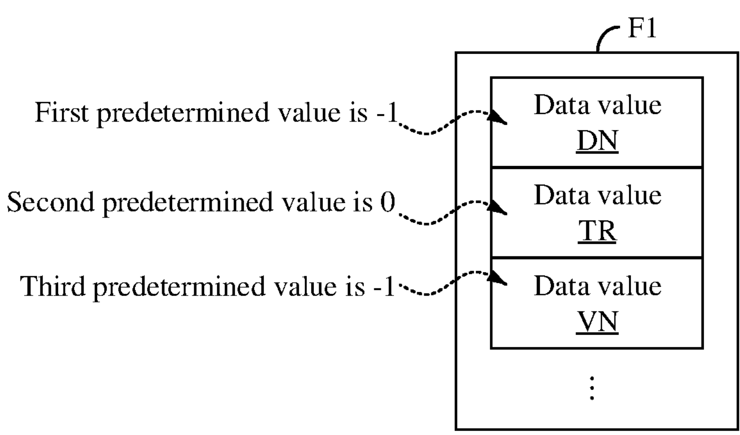
FIG. 2 is a schematic diagram of partial data of the frame data in FIG. 1 according to some embodiments of the present disclosure.

FIG. 2 is a schematic diagram of partial data of the frame data F1 in FIG. 1 according to some embodiments of the present disclosure. It should be understood that in the actual data structure, the frame data F1 includes multiple parameters and image data related to video playback. For ease of understanding, FIG. 2 only shows data values DN, TR, and VN related to the management of the memory 110.

As shown in FIG. 2, by additional definition, the frame data F1 includes data values DN, TR, and VN. The data value DN may be utilized to indicate a decoder in the decoders D[0]-D[x] that is currently using the frame data F1. For example, if the data value DN is 0, it means that the decoder D[0] is accessing the storage space in the memory 110 to read the frame data F1. In some implementations, the range of the data value DN is 0 to x.

The data value TR may be utilized to indicate whether the frame data F1 is outputted to the application layer 120. For example, if the decoder circuit 130 decodes the frame data F1 and transfers it to the application layer 120, the decoder circuit 130 may set the value of the data value TR to 1. Alternatively, if the application layer 120 returns the frame data F1 to the decoder circuit 130, the decoder circuit 130 may reset the value of the data value TR to a second predetermined value (e.g., 0).

The data value VN may be utilized to indicate which video output transmitter V[0]-V[y] is using a particular frame data F1. For example, if the data value VN is 0, it indicates that the video output transmitter V[0] is accessing the storage space in the memory 110 to read the frame data F1. In some embodiments, the range of the data value VN is 0 to y.

In some embodiments, the data values DN, TR, and VN have a first predetermined value, a second predetermined value, and a third predetermined value, respectively. For example, the first predetermined value may be −1 to indicate that no decoder is accessing the frame data F1, the second predetermined value may be 0 to indicate that the frame data F1 has not been transmitted to the application layer 120, and the third predetermined value may be −1 to indicate that no video output transmitter is accessing the frame data F1. In other words, at the end of the operation of the decoder circuit 130 and/or the video output circuit 140, whether the data values DN, TR, and VN in the frame data F1 are the first predetermined value, the second predetermined value, and the third predetermined value, respectively, may be determined. If the data values DN, TR, and VN are the first predetermined value, the second predetermined value, and the third predetermined value, respectively, it indicates that the frame data F1 has not been accessed. Under this condition, the storage space in the memory 110 for storing the frame data F1 can be cleared and released. FIG. 2 only illustrates the frame data F1 as an example. It should be understood that the remaining frame data F2-Fn in FIG. 1 also include the data values DN, TR, and VN mentioned above.

Figure 3A:
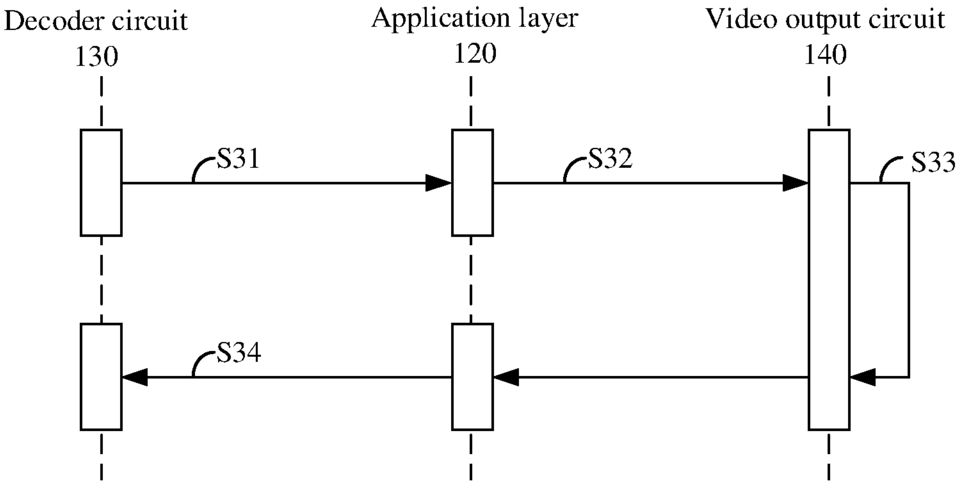
FIG. 3A illustrates a flowchart of operations of the video player system in FIG. 1 according to some embodiments of the present disclosure.

FIG. 3A illustrates a flowchart of operations of the video player system 100 in FIG. 1 according to some embodiments of the present disclosure. In operation S31, the decoder circuit 130 outputs the decoded frame data (e.g., frame data F1) to the application layer 120. In operation S32, the application layer 120 adds the decoded frame data to the queue of the video output circuit 140. In operation S33, the video output circuit 140 outputs the decoded frame data to the panel 100A to display the corresponding image content. In operation S34, the application layer 120 returns the frame data to the decoder circuit 130.

Figure 3B:
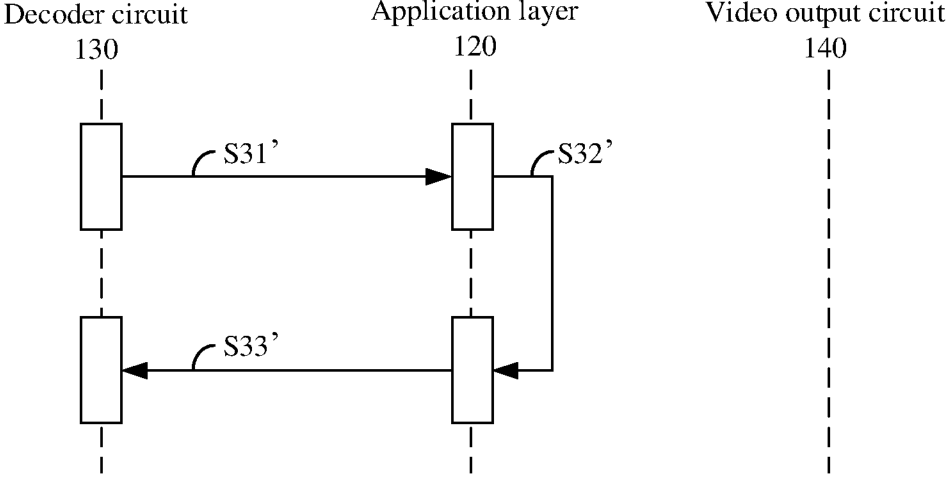
FIG. 3B illustrates another flowchart of operations of the video player system in FIG. 1 according to some embodiments of the present disclosure.

FIG. 3B illustrates another flowchart of operations of the video player system 100 of FIG. 1 according to some embodiments of the present disclosure. In operation S31', the decoder circuit 130 outputs the decoded frame data to the application layer 120. In operation S32', the application layer 120 discards the decoded frame data (i.e., decides not to display the content of the frame data). In operation S33', the application layer 120 returns the frame data to the decoder circuit 130. In other words, the flowchart of FIG. 3B represents the operation(s) where the frame data is not transmitted to the panel 100A for display, as opposed to the operation(s) of FIG. 3A where the frame data is transmitted to the panel 100A for display.

FIG. 4 illustrates a flowchart of the decoder circuit 130 and the video output circuit 140 in FIG. 1 selecting a specific decoder and a specific video output transmitter according to some embodiments of the present disclosure. In operation S41, a specific decoder is selected from decoders to determine the value of i, where the selected decoder is in an idle state. For example, the decoder circuit 130 may select an idle decoders D[i] from the decoder D[0]-[x] to determine the value of i, where the value of i corresponds to the decoder D[i].

Similarly, in operation S42, a specific video output transmitter is selected from the video output transmitters to determine the value of j, where the selected video output transmitter is in an idle state. For example, the video output circuit 140 may select an idle video output transmitter V[j] from the video output transmitters V[0]-V[y] to determine the value of j, where j corresponds to the video output transmitter V[j]. Operation S41 is performed by the decoder circuit 130, and operation S42 is performed by the video output circuit 140. Therefore, operations S41 and S42 may be performed simultaneously or in different orders.

Figure 5:
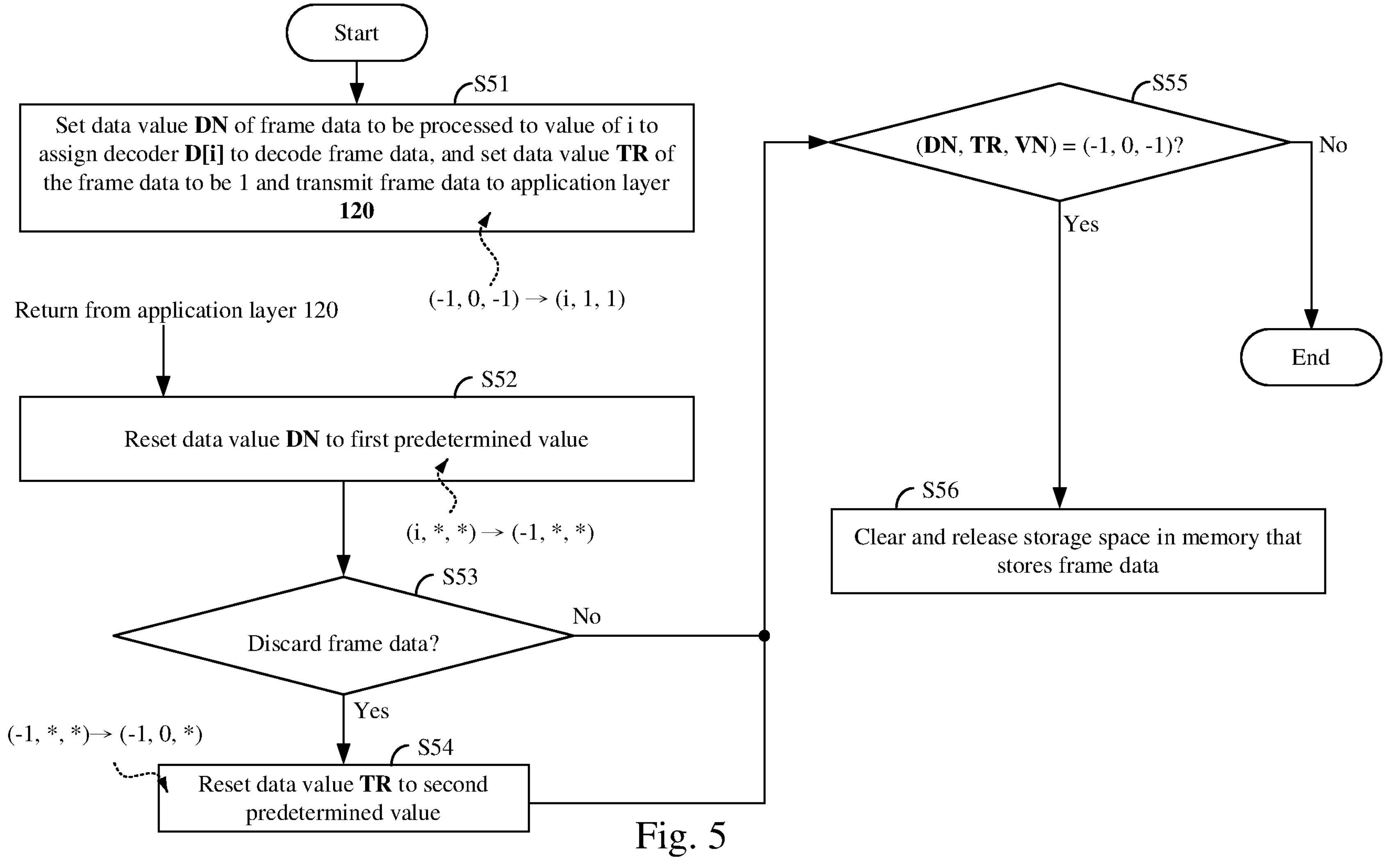
FIG. 5 illustrates a flowchart of operations performed during the operation of the decoder circuit in FIG. 1 according to some embodiments of the present disclosure.

FIG. 5 illustrates a flowchart of operations performed during the operation of the decoder circuit 130 in FIG. 1 according to some embodiments of the present disclosure. In operation S51, the data value DN of the frame data to be processed is set to the value of i to assign decoder D[i] to decode the frame data, and the data value TR of the frame data is set to 1 and the frame data is transmitted to the application layer 120. For example, during the initial phase, the data values DN, TR, and VN of frame data F1 are set to the first predetermined value (e.g., −1), the second predetermined value (e.g., 0), and the third predetermined value (e.g., −1), respectively, which can be represented as (DN, TR, VN)=(−1, 0, −1). After operation S51, the data values DN, TR, and VN mentioned above are respectively i, 1, and −1, which can be represented as (DN, TR, VN)=(i, 1, −1). The data value DN with the value of i indicates that the decoder D[i] is using frame data F1, and the data value TR with the value of 1 indicates that the frame data F1 will be outputted to the application layer 120.

In operation S52, if the application layer 120 returns the frame data to the decoder circuit 130 (e.g., operation S34 in FIG. 3A or operation S33' in FIG. 3B), the data value DN is reset to the first predetermined value. For example, after being processed by the application layer 120 and/or the video output circuit 140, the data value TR and the data value VN of the frame data F1 may be in an unknown state (represented by *), and thus the data values DN, TR, and VN may be i, *, and *, respectively, which can be represented as (DN, TR, VN)=(i, *, *). After operation S52, the aforementioned data values DN, TR, and VN are −1, *, and *, respectively, which can be represented as (DN, TR, VN)=(−1, *, *).

In operation S53, whether the application layer 120 discards the frame data is determined. If the application layer 120 discards the frame data, operation S54 is performed. Alternatively, if the application layer 120 does not discard the frame data, operation S55 is performed.

For example, in response to user instructions, the application layer 120 may determine whether to control the video output circuit 140 to output frame data F1. If the application layer 120 decides not to output the frame data F1 and returns the frame data F1 to the decoder circuit 130 (e.g., operation S33' in FIG. 3B), the application layer 120 may set some data values in the frame data F1 to indicate that the frame data F1 is expected to be discarded. The decoder circuit 130 may determine whether the application layer 120 discards the frame data F1 based on these data values. In operation S54, the data value TR is reset to the second predetermined value (e.g., resetting the data value TR to 0), and operation S55 is performed. For example, after operation S54, the aforementioned data values DN, TR, and VN are respectively −1, 0, and *, which can be represented as (DN, TR, VN)=(−1, 0, *). In operation S55, whether the data values DN, TR, and VN are respectively the first predetermined value, the second predetermined value, and the third predetermined value are determined (represented as (DN, TR, VN)=(−1, 0, −1)?). If the data values DN, TR, and VN are respectively the first predetermined value, the second predetermined value, and the third predetermined value, operation S56 is performed. Alternatively, if the data values DN, TR, and VN are not respectively the first predetermined value, the second predetermined value, and the third predetermined value, the operation is ended.

In operation S56, the storage space in the memory that stores the frame data is cleared and released. As mentioned above, if the data values DN, TR, and VN are respectively the first, second, and third predetermined values, it indicates that the frame data F1 has not been accessed. Under this condition, the storage space in the memory 110 that stores the frame data F1 can be cleared and released. As a result, it is able to enable the immediate release of more storage space for subsequent applications.

Figure 6:
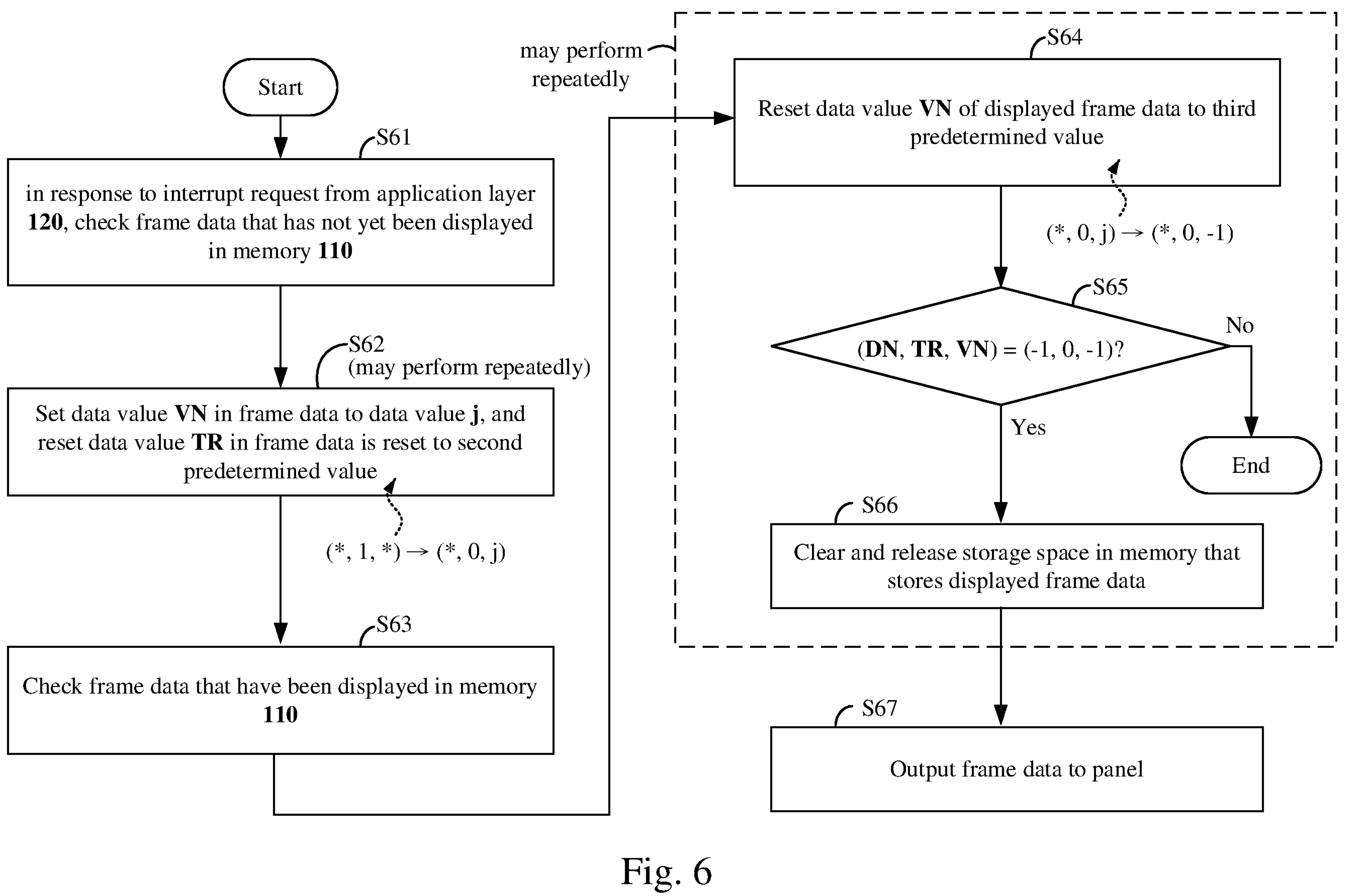
FIG. 6 illustrates a flowchart of operations performed by the video output circuit in FIG. 1 during operation according to some embodiments of the present disclosure.

FIG. 6 illustrates a flowchart of operations performed by the video output circuit 140 in FIG. 1 during operation according to some embodiments of the present disclosure. In operation S61, in response to an interrupt request from the application layer 120, frame data that has not yet been displayed in the memory 110 is checked. For example, the application layer 120 may send an interrupt request every predetermined period to control the video output circuit 140 to output one frame data. The video output circuit 140 may check at least one frame data in the memory 110 that has not yet been displayed in response to this interrupt request. As described above, storage spaces in the memory 110 may operate as video buffers. For example, the memory 110 may operate as a ring buffer with a write pointer and a read pointer. The video output circuit 140 may scan the storage space corresponding to the current read pointer to the storage space corresponding to the write pointer in the memory 110 in response to this interrupt request to check if there is any frame data that has not yet been displayed.

In operation S62, the data value VN in the frame data is set to data value j, and the data value TR in the frame data is reset to the second predetermined value. For example, in operation S61, the video output circuit 140 determines that the frame data F1 in the memory 110 has not been displayed, and the video output circuit 140 selects the frame data F1 from the memory 110. Then, the video output circuit 140 may set the data value VN of the frame data F1 to data value j to assign the video output transmitter V[j] to process the frame data F1, and reset the data value TR to the second predetermined value (i.e., 0). As a result, the frame data F1 can be transmitted to the panel 100A via the video output transmitter V[j] to display the corresponding image content. In other words, after operation S62, the data values DN, TR, and VN mentioned above are respectively *, 0, and j, which can be represented as (DN, TR, VN)=(*, 0, j). It should be understood that operation S62 can be repeated multiple times until the data values VN and TR in each of the frame data that has not been displayed in the memory 110 are adjusted.

In operation S63, frame data that have been displayed in the memory 110 are checked. For example, the video output circuit 140 may scan all the storage spaces in the memory 110 corresponding to the previously read pointer up to the current read pointer, to check that there are frame data that have been completely displayed. In the ring buffer, the value of the read pointer is updated each time a frame data is read. Therefore, the frame data stored from the storage space of the previous read pointer to the corresponding storage space of the current read pointer are the frame data that have been output by the video output circuit 140 (i.e., the displayed frame data).

In operation S64, the data value VN of the displayed frame data is reset to the third predetermined value. For example, in operation S63, the video output circuit 140 determines that the frame data Fn in the memory 110 has been displayed. The video output circuit 140 may reset the data value VN of the frame data Fn to the third predetermined value (i.e., −1). In other words, after operation S64, the aforementioned data values DN, TR, and VN are *, 0, and −1, which may be respectively represented as (DN, TR, VN)=(*, 0, −1). Alternatively, in another example, the video output circuit 140 may decide, in the subsequent operation S64, whether to reset the data value VN of the frame data Fn to the third predetermined value after outputting the aforementioned frame data F1.

In operation S65, whether the data values DN, TR, and VN are the first predetermined value, the second predetermined value, and the third predetermined value, respectively, are determined (represented as (DN, TR, VN)=(−1, 0, −1)?). If the data values DN, TR, and VN are the first predetermined value, the second predetermined value, and the third predetermined value, respectively, operation S66 is performed. Alternatively, if the data values DN, TR, and VN are not the first predetermined value, the second predetermined value, and the third predetermined value, respectively, the operation is ended.

In operation S66, the storage space in memory that stores displayed frame data is cleared and released. As mentioned above, if data values DN, TR, and VN are the first predetermined value, the second predetermined value, and the third predetermined value, respectively, it indicates that the frame data (e.g., frame data Fn) has not been accessed. Under this condition, the storage space in the memory 110 that stores the frame data Fn may be cleared and released. It should be understood that operations S64, S65, and S66 may be repeatedly performed until all storage space in the memory 110 that stores displayed frame data is cleared and released.

In operation S67, the frame data is outputted to the panel. For example, in operation S62, the video output circuit 140 assigns the video output transmitter V[j] to process the frame data F1. The video output transmitter V[j] may output the frame data F1 to the panel 100A, in order to drive the panel 100A to display the corresponding image content of the frame data F1.

Figure 7:
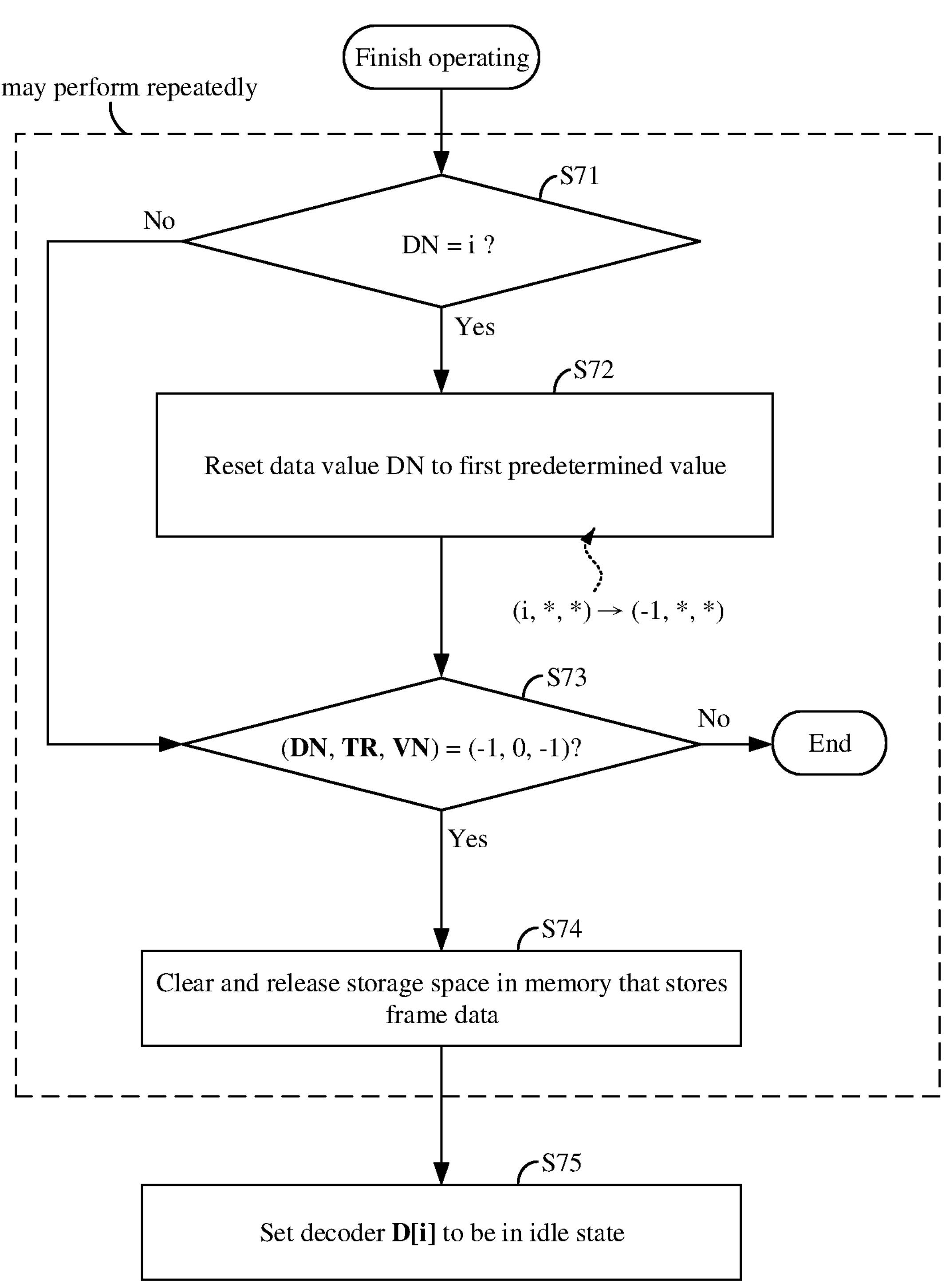
FIG. 7 illustrates a flowchart of operations performed by the decoder circuit in FIG. 1 when the decoder circuit finishes operating according to some embodiments of the present disclosure.

FIG. 7 illustrates a flowchart of operations performed by the decoder circuit 130 in FIG. 1 when the decoder circuit 130 finishes operating according to some embodiments of the present disclosure. In operation S71, whether the data value DN of each frame data in the memory is equal to the value of i is determined (represented as DN=i?). If the data value DN of each frame data in the memory 110 is equal to the value of i, operation S72 is performed. Alternatively, if the data value DN of each frame data in the memory 110 is not equal to the value of i, operation S73 is performed.

In operation S72, the data value DN is reset to the first predetermined value (e.g., −1). For example, after operation S72, the aforementioned data values DN, TR, and VN are −1, *, and *, respectively, which may be represented as (DN, TR, VN)=(−1, *, *). In operation S73, whether the data values DN, TR, and VN are the first predetermined value, the second predetermined value, and the third predetermined value, respectively, is determined (represented as (DN, TR, VN)=(−1, 0, −1)?). If the data values DN, TR, and VN are the first predetermined value, the second predetermined value, and the third predetermined value, respectively, operation S74 is performed. If the data values DN, TR, and VN are not the first predetermined value, the second predetermined value, and the third predetermined value, respectively, operation is ended.

In operation S74, the storage space in the memory that stores the frame data is cleared and released. As mentioned above, if the data values DN, TR, and VN are the first, second, and third predetermined values, respectively, it indicates that the frame data (e.g., frame data F1) has not been accessed. Under this condition, the storage space in the memory 110 that stores the frame data F1 may be cleared and released. It should be understood that operations S72 to S74 can be repeatedly performed until the storage spaces in the memory 110 that are assigned to the decoder D[i] for processing frame data are cleared and released. In operation S75, the decoder D[i] is set to be in the idle state. For example, after performing the above operations, the decoder circuit 130 may adjust the value of a register in the decoder D[i] to indicate that the decoder D[i] is currently in the idle state.

Figure 8:
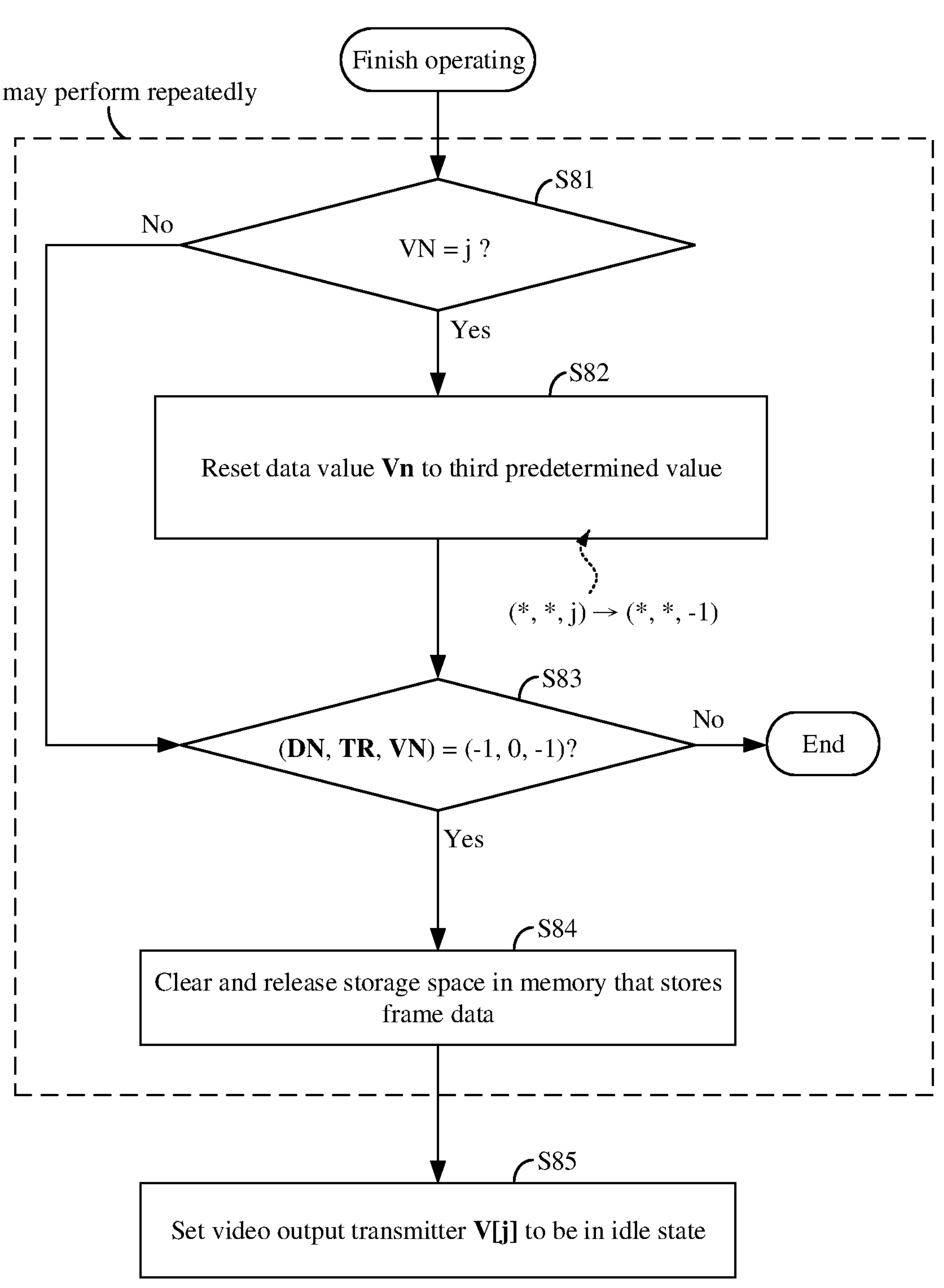
FIG. 8 illustrates a flowchart of operations performed by the video output circuit in FIG. 1 when the video output circuit finishes operating according to some embodiments of the present disclosure.

FIG. 8 illustrates a flowchart of operations performed by the video output circuit 140 in FIG. 1 when the video output circuit 140 finishes operating according to some embodiments of the present disclosure. In operation S81, whether the data value VN of the frame data in the memory is equal to a value of j is determined (represented as VN=j?). If the data value VN of each frame data in the memory 110 is equal to the value of j, operation S82 is performed. Alternatively, if the data value VN of each frame data in the memory 110 is not equal to the value of j, operation S83 is performed.

In operation S82, the data value VN is reset to the third predetermined value (e.g., −1). For example, after performing operation S82, data values DN, TR, and VN are *, *, and −1, which may be represented as (DN, TR, VN)=(*, *, −1). In operation S83, whether the data values DN, TR, and VN are the first, second, and third predetermined values, respectively, are determined (represented as (DN, TR, VN)=(−1, 0, −1)?). If the data values DN, TR, and VN are the first, second, and third predetermined values, respectively, operation S84 is performed. Alternatively, if the data values DN, TR, and VN are not the first, second, and third predetermined values, respectively, the operation is ended.

In operation S84, the storage space in the memory that stores the frame data is cleared and released. As mentioned above, if the data values DN, TR, and VN are the first, second, and third predetermined values, respectively, it indicates that the frame data (e.g., frame data F1) has not been accessed. Under this condition, the storage space in the memory 110 that stores the frame data F1 assigned to the video output transmitter V[j] may be cleared and released. It should be understood that the operations S82 to S84 can be repeatedly performed for multiple times until the storage spaces in the memory 110 assigned to the video output transmitter V[j] for processing the frame data are cleared and released. In operation S85, the video output transmitter V[j] is set to be in the idle state. For example, after completing the above operations, the video output circuit 140 may adjust the value of a register in the video output transmitter V[j] to indicate that the video output transmitter V[j] is currently in the idle state.

With operations in FIGS. 4-8, the decoder circuit 130 and the video output circuit 140 may determine whether the corresponding storage space in the memory 110 is being accessed based on the data values DN, TR, and VN in the frame data F1-Fn. If the corresponding storage space is not being accessed (i.e., when the data values DN, TR, and VN are the first, second, and third predetermined values, respectively), the decoder circuit 130 and the video output circuit 140 are able to immediately clear the corresponding storage space, in order to release more storage space(s) in the memory 110 for subsequent video playback. As a result, the application layer 120, the decoder circuit 130, and the video output circuit 140 can operate independently and access the memory 110 collaboratively, without repeatedly copying frame data and sending it back and forth between the application layer 120, the decoder circuit 130, and the video output circuit 140. Accordingly, the efficiency of the memory 110 usage in multi-channel video playback applications can be improved, thereby enhancing system performance.

Figure 9:
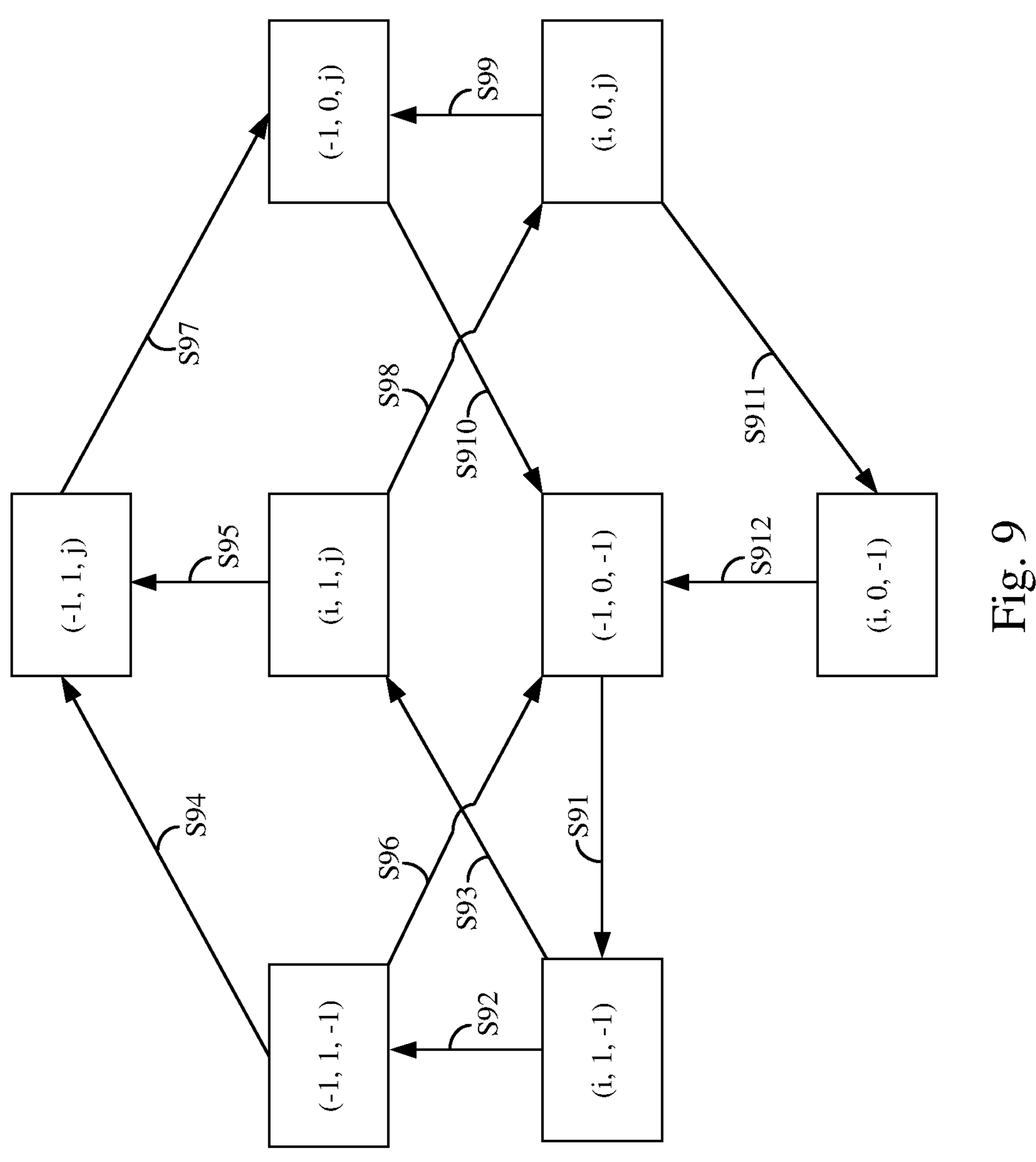
FIG. 9 illustrates a schematic diagram of switching states of the data values in FIG. 2 according to some embodiments of the present disclosure.

FIG. 9 illustrates a schematic diagram of switching states of the data values DN, TR, and VN in FIG. 2 according to some embodiments of the present disclosure. In the initial state, the data values DN, TR, and VN are set to the first, second, and third predetermined values, respectively, which can be represented as (−1, 0, −1). In operation S91, the data values DN, TR, and VN are set to the value of i, the value of 1, and the third predetermined value, respectively, which can be represented as (i, 1, −1). Operation S91 may correspond to operation S51 in FIG. 5.

In operation S92, the data values DN, TR, and VN are set to the first predetermined value, the value of 1, and the third predetermined value, respectively, which can be represented as (−1, 1, −1). Operation S92 may correspond to operation S52 in FIG. 5. In operation S93, the data values DN, TR, and VN are set to the values of i, 1, and j, respectively, which can be represented as (i, 1, j). Operation S93 may correspond to a portion of operation S62 in FIG. 6.

In operation S94, the data values DN, TR, and VN are respectively set to the first predetermined value, the value of 1, and the value of j, which can be represented as (−1, 1, j). Operation S94 may be a portion of operation S62 in FIG. 6. In operation S95, the data values DN, TR, and VN are respectively set to the first predetermined value, the value of 1, and the value of j. Operation S95 may be operation S52 in FIG. 5. In operation S96, the data values DN, TR, and VN are set to the first, second, and third predetermined values, respectively, which can be represented as (−1, 0, −1). Operation S96 can be a portion of operation S62 in FIG. 6 and/or S54 in FIG. 5. In operation S97, the data values DN, TR, and VN are set to the first predetermined value, the second predetermined value, and the value of j, respectively, which can be represented as (−1, 0, j). Operation S97 may be a portion of operation S62 in FIG. 6.

In operation S98, the data values DN, TR, and VN are set to the value of i, the second predetermined value, and the value of j, respectively, which can be represented as (i, 0, j). Operation S98 is a portion of operation S62 in FIG. 6. In operation S99, the data values DN, TR, and VN are set to the first predetermined value, the second predetermined value, and the value of j, respectively, which can be represented as (−1, 0, j). Operation S99 is operation S72 in FIG. 7. In operation 5910, multiple data values DN, TR, and VN are set to the first, second, and third predetermined values, respectively, which can be represented as (−1, 0, −1). Operation 5910 is operation S82 in FIG. 8. In operation 5911, the data values DN, TR, and VN are set to the value of i, the second predetermined value, and the third predetermined value, respectively, which can be represented as (i, 0, −1). Operation 5911 is operation S82 in FIG. 8. In operation 5912, the data values DN, TR, and VN are set to the first, second, and third predetermined values, respectively, which can be represented as (−1, 0, −1). Operation 5912 may be operation S72 in FIG. 7. The switching states of the above data values DN, TR, and VN can refer to operations in FIGS. 4 to 8, and therefore the repetitious descriptions are not further given here.

FIG. 10 illustrates a flowchart of a memory management method 1000 according to some embodiments of the present disclosure. In operation S1010, a first data value (e.g., data value DN) of first frame data is set to a first value (e.g., value of i) to assign a first decoder in the decoders that corresponds to the first value to decode the first frame data, and a second data value (e.g., data value TR) of the first frame data is set to a second value (e.g., 1), and the first frame data is transmitted to an application layer. In operation S1020, based on the control of the application layer, a third data value (e.g., data value VN) of the first frame data is set to a third value (e.g., a value of j) to assign a first video output transmitter in the video output transmitters that corresponds to the third value to output the first frame data. In operation S1030, whether to clear the storage space in the memory that stores the first frame data is determined according to the first data value, the second data value, and the third data value.

The above operations of the memory management method 1000 can be understood with reference to above embodiments, and thus the repetitious descriptions are not further given. The above description of the operations shown in FIGS. 5-10 includes exemplary operations, but the operations shown in FIGS. 5-10 are not necessarily performed in the order described above. Operations shown in FIGS. 5-10 may be added, replaced, changed order, and/or eliminated, or one or more operations shown in FIGS. 5-10 may be executed simultaneously or partially simultaneously as appropriate, in accordance with the spirit and scope of various embodiments of the present disclosure.

As described above, the memory management method and the video player system in some embodiments of the present disclosure may utilize storage space(s) in a memory based on data values in the frame data (e.g., the data values mentioned in FIG. 2) without repeatedly copying and swapping frame data during the output process. Furthermore, the memory management method and video player system proposed in some embodiments of the present disclosure may determine whether to clear and release the storage space(s) based on those data values. As a result, the memory can be timely controlled to release the storage space(s) to improve the processing efficiency of multi-channel video playback.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A memory management method, comprising:

setting a first data value of first frame data to a first value to assign a first decoder in a plurality of decoders that corresponds to the first value to decode the first frame data, setting a second data value of the first frame data to a second value, and outputting the first frame data to an application layer;

based on a control of the application layer, setting a third data value of the first frame data to a third value, in order to assign a first video output transmitter in a plurality of video output transmitters to output the first frame data; and determining whether to clear a storage space in a memory that stores the first frame data according to the first data value, the second data value, and the third data value.

2. The memory management method of claim 1, further comprising:

if the application layer returns the first frame data to the first decoder, resetting the first data value to a first predetermined value; and if the application layer discards the first frame data, resetting the second data value to a second predetermined value, and determining whether to clear the storage space.

3. The memory management method of claim 1, wherein based on the control of the application layer, setting the third data value of the first frame data to the third value, in order to assign the first video output transmitter in the plurality of video output transmitters to output the first frame data comprises:

in response to an interrupt request from the application layer, setting the third data value to the third value and resetting the second data value to a predetermined value, in order to assign the first video output transmitter to output the first frame data.

4. The memory management method of claim 3, further comprising:

in response to the interrupt request, checking at least one frame data in the memory that has not been displayed to select the first frame data.

5. The memory management method of claim 1, further comprising:

after the first frame data is outputted, resetting the third data value to a predetermined value and determining whether to clear the storage space.

6. The memory management method of claim 5, further comprising:

after the first frame data is outputted, checking at least one frame data in the memory that has been displayed to select the first frame data.

7. The memory management method of claim 1, further comprising:

when the first decoder finishes operating, determining whether the first data value is the first value;

if the first data value is the first value, resetting the first data value to a predetermined value;

after the first data value is reset to the predetermined value or if the first data value is not the first value, determining whether to clear the storage space; and after the storage space is cleared, setting the first decoder to be in an idle state.

8. The memory management method of claim 1, further comprising:

when the first video output transmitter finishes operating, determining whether the third data value is the third value;

if the third data value is the third value, resetting the third data value to a predetermined value;

after the third data value is reset to the predetermined value or if the third data value is not the third value, determining whether to clear the storage space; and after the storage space is cleared, setting the first video output transmitter to be in an idle state.

9. The memory management method of claim 1, wherein the determining whether to clear the storage space in the memory that stores the first frame data according to the first data value, the second data value, and the third data value comprises:

if the first data value, the second data value, and the third data value are a first predetermined value, a second predetermined value, a third predetermined value, respectively, clearing the first frame data to release the storage space.

10. The memory management method of claim 1, further comprising:

selecting the first decoder from the plurality of decoders to determine the first value, wherein the first decoder is in an idle state, and the plurality of decoders correspond to a plurality of channels.

11. The memory management method of claim 1, further comprising:

selecting the first video output transmitter from the plurality of video output transmitters to determine the third value, wherein the first video output transmitter is in an idle state, and the plurality of video output transmitters correspond to a plurality of channels.

12. A video player system, comprising:

a decoder circuit comprising a plurality of decoders and configured to set a first data value of first frame data to a first value to assign a first decoder in the plurality of decoders that corresponds to the first value to decode the first frame data, set a second data value of the first frame data to a second value, and transmit the first frame data to an application layer; and a video output circuit comprising a plurality of video output transmitters and configured to, based on a control of the application layer, set a third data value of the first frame data to a third value to assign a first video output transmitter in the plurality of video output transmitters that corresponds to the third value to output the first frame data, wherein the decoder circuit or the video output circuit is further configured to determine whether to clear a storage space in a memory that stores the first frame data according to the first data value, the second data value, and the third data value.

13. The video player system of claim 12, wherein the video output circuit is configured to, in response to an interrupt request from the application layer, set the third data value to the third value and reset the second data value to a predetermined value, in order to assign the first video output transmitter to output the first frame data.

14. The video player system of claim 13, wherein the video output circuit is further configured to, in response to the interrupt request, check at least one frame data in the memory that has not been displayed to select the first frame data.

15. The video player system of claim 12, wherein the video output circuit is further configured to reset the third data value to a predetermined value after the first frame data is outputted, and determine whether to clear the storage space.

16. The video player system of claim 12, wherein when the first decoder finishes operating, the decoder circuit is further configured to determine whether the first data value is the first value, if the first data value is the first value, the decoder circuit resets the first data value to a predetermined value, and after the first data value is reset to the predetermined value or if the first data value is not the first value, the decoder circuit is further configured to determine whether to clear the storage space, and set the first decoder to be in an idle state after the storage space is cleared.

17. The video player system of claim 12, wherein when the first video output transmitter finishes operating, the video output circuit is further configured to determine whether the third data value is the third value, if the third data value is the third value, the video output circuit resets the third data value to a predetermined value, and after the third data value is reset to the predetermined value or if the third data value is not the third value, the video output circuit is further configured to determine whether to clear the storage space, and set the first video output transmitter to be in an idle state after the storage space is cleared.

18. The video player system of claim 12, wherein if the first data value, the second data value, and the third data value are a first predetermined value, a second predetermined value, a third predetermined value, respectively, the decoder circuit or the video output circuit is further configured to clear the first frame data to release the storage space.

19. The video player system of claim 12, wherein the decoder circuit is further configured to select the first decoder from the plurality of decoders to determine the first value, the first decoder is in an idle state, and the plurality of decoders correspond to a plurality of channels.

20. The video player system of claim 12, wherein the video output circuit is further configured to select the first video output transmitter from the plurality of video output transmitters to determine the third value, the first video output transmitter is in an idle state, and the plurality of video output transmitters correspond to a plurality of channels.

* * * * *